United States Patent [19]

Whyte et al.

[11] 3,967,264

[45] June 29, 1976

[54] DISTRIBUTION NETWORK POWER LINE COMMUNICATION SYSTEM INCLUDING ADDRESSABLE INTERROGATION AND RESPONSE REPEATER

[75] Inventors: Ian A. Whyte, Pittsburgh; Louis G. Ottobre, Murrysville; James P. McGivern, Pittsburgh, all of Pa.

[73] Assignee: Westinghouse Electric Corporation, Pittsburgh, Pa.

[22] Filed: Jan. 31, 1975

[21] Appl. No.: 546,069

[52] U.S. Cl. .............................. 340/310 A; 325/5; 340/151
[51] Int. Cl.² ...................................... H04M 11/04
[58] Field of Search ............ 340/310 R, 151, 310 A, 340/313; 325/5, 13; 179/2 DP

[56] References Cited
UNITED STATES PATENTS

| | | | |
|---|---|---|---|
| 3,264,633 | 8/1966 | Hellar | 340/310 A |
| 3,359,551 | 12/1967 | Dennison | 340/310 A |
| 3,656,112 | 4/1972 | Paull | 340/310 A |
| 3,693,155 | 9/1972 | Crafton et al. | 340/310 R |

Primary Examiner—John W. Caldwell
Assistant Examiner—James J. Groody
Attorney, Agent, or Firm—D. R. Lackey

[57] ABSTRACT

A distribution network power line communication system which is divided into addressable communication zones defined by repeaters located at the distribution transformers of the distribution network. Each repeater, when uniquely addressed by an interrogation signal from an interrogating source, strips its address from the interrogation signal and sends the resulting modified interrogation signal to its associated remote communication terminals, by-passing the associated distribution transformer. A timely, error-free response signal from a remote communication terminal is modified by a repeater to include the repeater address, and the modified response signal is sent back to the interrogating source. The binary base band interrogation and response signal information is preferably pulse width modulated to provide a self clocking format, and this self clocking signal is passed through two stages of frequency modulation to provide a signal which makes the receivers thereof substantially immune from drift.

63 Claims, 7 Drawing Figures

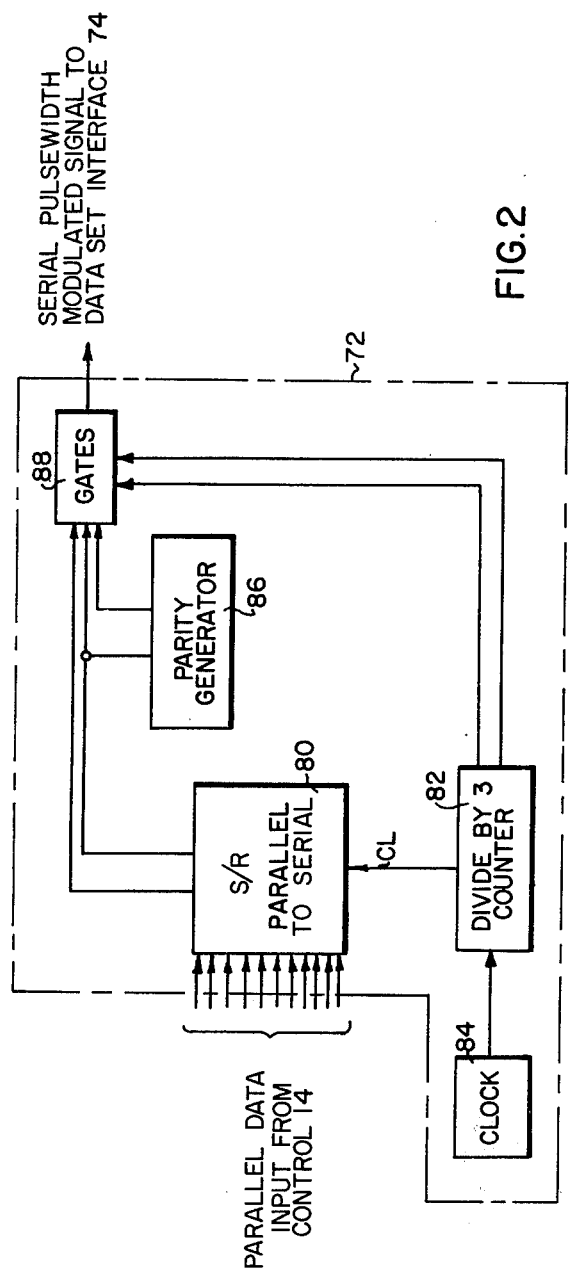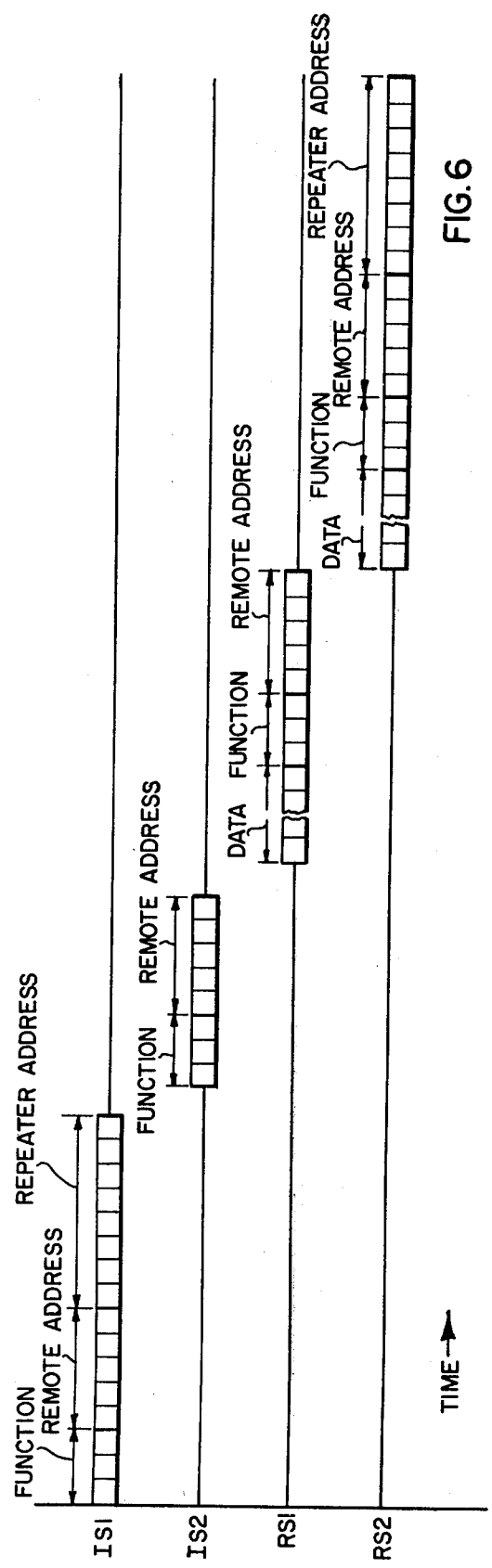

DISTRIBUTION NETWORK POWER LINE COMMUNICATION SYSTEM INCLUDING ADDRESSABLE INTERROGATION AND RESPONSE REPEATER

BACKGROUND OF THE INVENTION

1. Field of the Invention:

The invention relates in general to power line carrier communication systems, and more specifically to distribution network power line carrier systems for performing distribution automation functions.

2. Description of the Prior Art:

Power line carrier communication has been used for many years over high voltage transmission lines between the power generating site and power transmission switching site or distribution substation sites, for supervisory control purposes. Less common is communication over the power line conductors of a distribution network, from the distribution substation through the distribution transformers to the electrical load. Communicating over the distribution network power lines is more difficult than over the high voltage transmission lines, as the distribution lines, along with the large number of distribution transformers, present poor high frequency impedance characteristics which rapidly attenuate the communication signals, as well as introducing electrical noise and signal interference.

The recent increase in the desirability of performing certain distribution automation functions, such as automatic reading of utility meters, selective load control, performing load continuity checks, and the like, has made it attractive to use the distribution power line conductors for communications, but the problems connected therewith will have to be economically dealt with in order to provide a practical system.

U.S. Pat. Nos. 3,656,112; 3,702,460 and 3,815,119; and co-pending application Ser. No. 425,759, and now abandoned, filed Dec. 18, 1973, all disclose some form of communication via the distribution network of an electrical utility. U.S. Pat. No. 3,656,112 discloses a communications system which uses a combination of electric power line and wireless. The wireless link is used to by-pass distribution transformers and other obstructions located in the transmission path. U.S. Pat. No. 3,702,460 discloses making the neutral conductor of the distribution power line available as a communication link by inserting a parallel resonant circuit between the neutral and ground, at each ground point in the system. The neutral-ground communication circuit by-passes distribution transformers. U.S. Pat. No. 3,815,119 uses the power line conductors on the secondary side of a distribution transformer to transfer the various meter readings associated with the secondary to a common receiver point, where the readings are stored until they can be read, such as by a mobile unit which periodically travels near the receiver site and interrogates the site by a wireless link. The co-pending application, which is assigned to the same assignee as the present application, provides communication zones by using repeaters as frequency translators, isolating various sections of the distribution power line system by using different frequencies.

SUMMARY OF THE INVENTION

Briefly, the present invention is a new and improved distribution network power line communication system for performing distribution automation functions, such as automatically reading utility meters, making service continuity checks, and selectively controlling the electrical loads. The electrical distribution network includes a substation, primary power line conductors from the substation to a plurality of distribution transformers, and secondary power line conductors from the distribution transformer to a plurality of electrical loads.

Interrogation and response communication links are provided which extend between a central communication terminal located at the substation and remote communication terminals located at the electrical loads. These communication links utilize the primary and secondary power line conductors of the electrical distribution system. The communication links are divided into addressable zones by signal and frequency translating repeaters located at the distribution transformers. The repeaters provide logic and storage functions, they change the frequency of a signal received from the central communication terminal at the substation, or from one of its associated remote communication terminals, to a frequency band which is non-overlapping with the band of the received signal, they prevent the failure of a remote terminal in the "on" mode from tying up the whole system, and, at least in the interrogation communication link, they by-pass the distribution transformers.

The central communications terminal at the substation receives an interrogation signal from a central control location by conventional means, such as via a telephone line, and using this signal as a modulating wave, sends the interrogation signal to the addressable repeaters over the primary line conductors. The interrogation signal includes first and second addresses, the address of a repeater, and the address of a remote communication terminal associated with that repeater, respectively. If more than one automation function may be performed, the interrogation signal also includes a function identifier.

A repeater which is uniquely addressed by an error-free interrogation signal, modifies the interrogation signal by removing its address therefrom, it sends the modified interrogation signal to its associated remote communication terminals over the secondary power line conductors, it enables a response receiving channel of the repeater for a time sufficient to receive the response signal from the uniquely addressed remote communication terminal, and it stores the address of the remote communication terminal it is expecting a response signal from.

A remote communication terminal which is uniquely addressed by an error-free modified interrogation signal decodes the function identifier, it performs the requested function, and it provides a response signal on its associated secondary power line conductors, which response signal includes at least the address of the responding remote communication terminal, and if the requested function was to read a utility meter, the signal includes data representing the reading.

If the repeater receives an error-free response from the proper remote communication terminal within the prescribed time, the repeater modifies the response signal by adding its address thereto and it sends the modified response signal to the central communication terminal. The repeater may by-pass the associated distribution transformer in the response communication link, if desired, but in the preferred embodiment the repeater sends the modified response signal to the central communication terminal through the windings of the associated distribution transformer.

The central communication terminal, upon receiving an error-free modified response signal sends the modified response signal to the central control location by conventional means, such as via a telephone link.

Each transmission of a signal over power line conductors by the central communication terminal, repeaters, and remote communication terminals, preferably utilizes a new and improved two stage frequency modulation which makes the receiver of such signal substantially immune from drift. Also, at least certain of the transmissions of the interrogation and response signals are preferably preceded by a pulse width modulation stage which converts the binary base band information into a binary signal having a self clocking format.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 2 is a block schematic diagram which may be used for the parallel to serial converter and pulse width modulation stage shown in FIG. 1;

FIG. 6 is a graph which illustrates the format of the various interrogation and response signals used in the power line distribution communication system shown in FIGS. 1–5.

DESCRIPTION OF THE PREFERRED EMBODIMENTS

Figure 1:
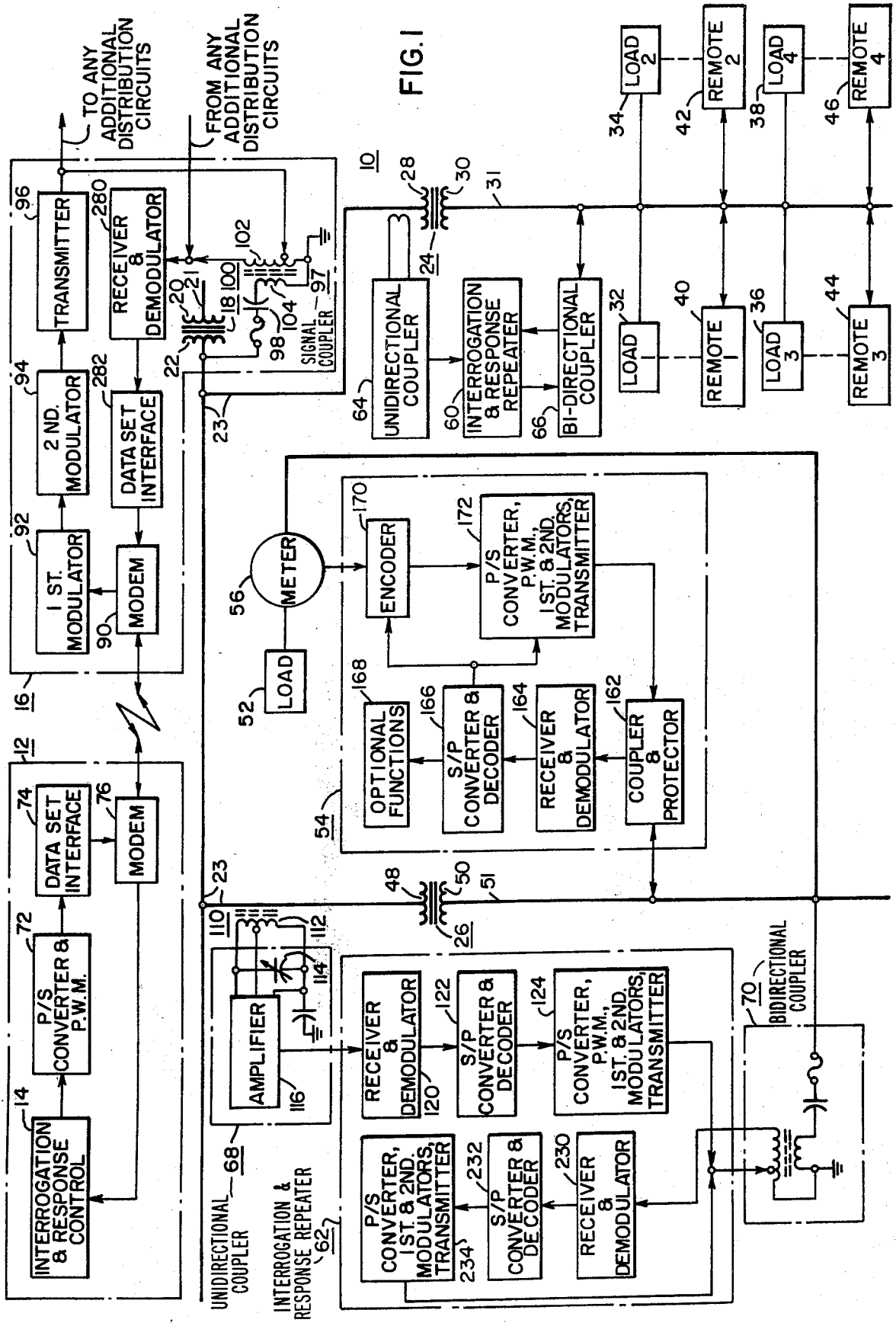
FIG. 1 is a block diagram of a power line distribution communication system constructed according to the teachings of the invention.

Referring now to the drawings, and FIG. 1 in particular, there is shown a block diagram of a new and improved distribution power line carrier communication system 10 constructed according to the teachings of the invention. Certain of the remaining Figures will also be referred to when describing FIG. 1. For examples, FIGS. 6 and 7, which illustrate signal formats and wave forms, respectively, will be referred to when appropriate.

The distribution power line carrier communication system 10 includes a source 12 of interrogation signals. Source 12 includes interrogation and response control 14, such as a digital computer located at the main control location, such as the central business office of an electrical utility. The computer may be programmed, for example, to interrogate remote communication terminals associated with loads connected to the distribution power lines of the electrical utility, to obtain data relative to the readings of utility meters, such as electrical, gas and water meters, and/or it may request the performance of other functions such as controlling non-critical loads. Electrical loads, such as electrically operated hot water heaters, may be selectively turned off and enabled, in order to provide a more constant overall demand for electrical power. Load continuity checks and service disconnect functions may also be provided.

The interrogation signals which are prepared by control 14 are sent by any conventional means to a selected distribution substation. Each of the substations to be communicated with include a central communication terminal for receiving interrogation signals from, and for sending response signals to, the source 12 of interrogations signals located at the central or main control location. For purposes of example, FIG. 1 illustrates a single central communication terminal/distribution substation combination 16, as each such combination would be of like construction.

A convenient medium for communicating between the source 12 at the main control location and the plurality of distribution substations, is by telephone. The address of each distribution substation would be a telephone number, with the interrogation and response control 14 gaining access to a selected substation by automatically dialing its number. In like manner, when a communication terminal at a substation has a response signal for source 12, it would gain access to the source 12 by automatically dialing the telephone number associated with the source. A telephone link is an economical and convenient method of communicating between source 12 and the plurality of substations, and for purposes of example, it will be assumed that this portion of the interrogation and response communication link is the telephone. However, it is to be understood that this specific link may be wireless, such as radio or microwave, or any other suitable form of communication.

Each distribution substation includes one or more step-down power transformers, such as transformer 18, which includes primary windings 20 connected to the high voltage transmission lines 21, and secondary windings 22 connected to the primary distribution network. The primary distribution network will be referred to as the first distribution power line conductors 23.

The primary distribution network voltage level is stepped down to the secondary voltage distribution level near the connected loads by a plurality of distribution transformers, such as distribution transformers 24 and 26. Distribution transformer 24 includes primary windings 28 connected to the first power line conductors 23, and secondary windings 30 connected to a secondary distribution network 31 which will be referred to as the second distribution power line conductors. Electrical loads, such as residential customers, are connected to the second power line conductors 31, with four electrical loads 32, 34, 36 and 38 being illustrated. Each electrical load has an addressable remote communication terminal associated therewith, with electrical loads 32, 34, 36 and 38 having addressable communication terminals 40, 42, 44 and 46, respectively. The remote communication terminals are each connected to the second distribution power line conductors 31.

In like manner, distribution transformer 26 includes primary windings 48 connected to the first power line conductors 23, and secondary windings 50 connected to a secondary distribution network 51, which will be referred to as the second distribution power line conductors. Electrical loads, such as load 52, are connected to the power line conductors 51. Electrical load 52 has an addressable remote communication terminal 54 associated therewith, which is connected to the second power line conductors 51, such as for reading a meter 56 associated with the load 52, and/or for performing other distribution automation functions.

Each distribution transformer has an addressable repeater associated therewith, with repeaters 60 and 62 being associated with distribution transformers 24 and 26, respectively. In a preferred embodiment of the invention, the repeaters are coupled to power line conductors with a unidirectional coupler on the primary side of the distribution transformer, and by a bidirectional coupler on the secondary side of the transformer. Distribution transformer 24 has a unidirectional coupler 64 magnetically coupled to one or more of the first distribution power line conductors 23 and a bidirectional coupler 66 connected to one or more of the second power line conductors 31. Distribution transformer 26 has a unidirectional coupler 68 magnetically coupled to one or more of the first power line conductors 23, and a bidirectional coupler 70 connected to one or more of the second power line conductors 51.

The distribution power line carrier communication system 10 is thus divided into addressable zones defined by the uniquely addressable repeaters and the uniquely addressable remote communication terminals, and each distribution substation is also an addressable zone of the complete distribution system. When considering only the communication network which starts at each substation, one addressable zone includes a first communication link which extends from the substation transformer 18 to each distribution transformer 24 and 26 over the first power line conductors 23, and another addressable zone extends from each distribution transformer 24 and 26 to its connected loads over the second power line conductors 31 and 51, respectively.

When observing the complete communication system from an interrogation and response signal viewpoint, the interrogation communication link includes the source 12 of interrogation signals, the communication link between the source 12 and the central communication terminal 16, such as a telephone link, the central communication terminal 16, the fiirst power line conductors 23, a plurality of unidirectional couplers, addressable repeaters and bidirectional coupler combinations, one for each distribution transformer, such as the combination which includes unidirectional coupler 64, addressable repeater 60 and bidirectional coupler 66, second power line conductors, such as power line conductors 31, and a plurality of addressable remote communication terminals associated with each second power line conductor network, such as remote communication terminals 40, 42, 44, and 46. It will be noted that the distribution transformers are not part of the interrogation communication link. A response communication link extends from each addressable remote communication terminal, such as remote terminal 40, over the second power line conductors, such as conductors 31, via a bidirectional coupler, through a repeater, and back to the second power line conductors via the bidirectional coupler, such as coupler 66, repeater 60, and coupler 66, respectively through the associated distribution transformer from the secondary windings to the primary windings thereof, such as from the secondary windings 30 to the primary windings 28 of distribution transformer 24, over the first power line conductors 23 to the central communication terminal 16 located at the substation, and then through the telephone link to the interrogation and response control 14 located at the central control location.

In this preferred embodiment of the invention, the interrogation signal by-passes the distribution transformers while a response signal goes through the distribution transformers. This arrangement provides economical advantages while circumventing the most troublesome attenuation problems. In the interrogation link, the distribution transformers are located long distances from the central communication terminal 16 and its associated transmitter, with the amount of attenuation from terminal 16 to each distribution transformer being different. Therefore, it is not desirable to subject this unknown signal strength to the relatively high attenuating impedance which exists between the primary and secondary windings of a distribution transformer, and the signal is therefore picked up on the primary side of the distribution transformers.

A coupler for receiving a signal from a power line may be a relatively low cost magnetic field coupler, which does not require direct contact with the first power line conductor means, and thus does not have to block the flow of 60 Hz current. A coupler for applying a signal to a power line preferably contacts the power line to effectively couple the signal to the conductor, and thus must include a low frequency blocking capacitor. It is more economical to couple the signal into one or more of the lower voltage second power line conductors than it is to the first power line conductors.

The repeaters are located at the distribution transformers and thus when they apply an amplified response signal received from a remote communication terminal back to the second power line conductors, it is known what signal strength will be applied to the secondary of the transformer and what signal strength will appear on the primary side of the transformer for transmission to the central communication terminal 16 over the first power line conductors. While the attenuating impedance presented by a distribution transformer to a communication signal depends upon the specific design of the distribution transformer, the attenuation from the secondary to the primary side of the distribution transformer is usually about one-half the attenuation from the primary to the secondary side, and this characteristic is used to advantage in the preferred embodiments. Also, only one high voltage coupler is required per primary distribution circuit of the type which physically contacts the first power line conductors, providing a substantial savings in the cost of signal couplers.

The addressable repeaters also substantially reduce the complexity, and therefore the cost, of the remote communication terminals associated with the electrical loads, as the addressable repeaters remove their address from the interrogation signal before transmitting the interrogation signal to their associated remote communication terminals. Thus, the bit length of the interrogation signals applied to each remote communication terminal is substantially reduced, compared with the original interrogation signal, and the bit capacity of the devices, such as shift registers and comparators, associated with the remote terminals, is reduced accordingly.

Each remote terminal may add the address of its repeater to its response signal, as it is less costly to add bits to a transmitted signal than it is to receive and recognize additional bits in a signal. However, the preferred embodiment of the invention adds the repeater address to the response signal in the response channel of the repeater. This arrangement maintains the concept of minimizing the requirements of a remote communication terminal, and adding equipment to the addressable repeaters, which arrangement reduces the system cost since there are many more remote communication terminals than distribution transformers and associated repeaters.

Each transmitting portion of a circuit which prepares a binary signal for power line carrier transmission, except the last transmitter which prepares a response signal for the digital computer located at the source 12 of interrogation signals, preferably includes a pulse width modulation stage prior to the stages for modulating a carrier, in order to convert the binary signal to a signal which has a self clocking format. Further, each modulation of the pulse width modulated signal is preferably a two stage modulation which includes a sequential tone modulation, preferably in the audio range, and a modulation stage which uses the sequential tone to modulate a high frequency carrier. This latter modulating stage is preferably a frequency shift keying stage, which switches the carrier between two frequencies at a rate dependent upon the frequency of the modulating wave. Thus, the resulting carrier signal is dependent upon the rate of change between two frequencies, and is not dependent upon the absolute magnitude of a frequency. A receiver of a signal processed by this two stage modulation is substantially impervious to drift.

Returning now to the source 12 of interrogation signals, in addition to the digital computer for preparing the interrogation signal and receiving the response signal, indicated by the interrogation and response control 14, the central control location also includes a parallel to serial converter, and as hereinbefore stated, a pulse width modulator for converting the base band binary signal to a self-clocking format, which functions are illustrated at block 72. The resulting seralized signal has a format which makes it unnecessary to provide synchronizing and clocking pulses from the computer for the receiver of the signal. This signal with the self-clocking format is applied to a data set interface 74, such a Texas Instrument's SN75150, and then to a modem 76.

The interrogation and response control 14 prepares the interrogation signal in parallel form, which signal includes the address of the remote communication terminal which is to be accessed. This address is in two parts. The first part is the address of a repeater which the remote communication terminal is associated with, and the second part is the address of a remote terminal itself. A function identifier is also included in the interrogation signal when a plurality of automation functions are to be selectively performed.

Figure 7:
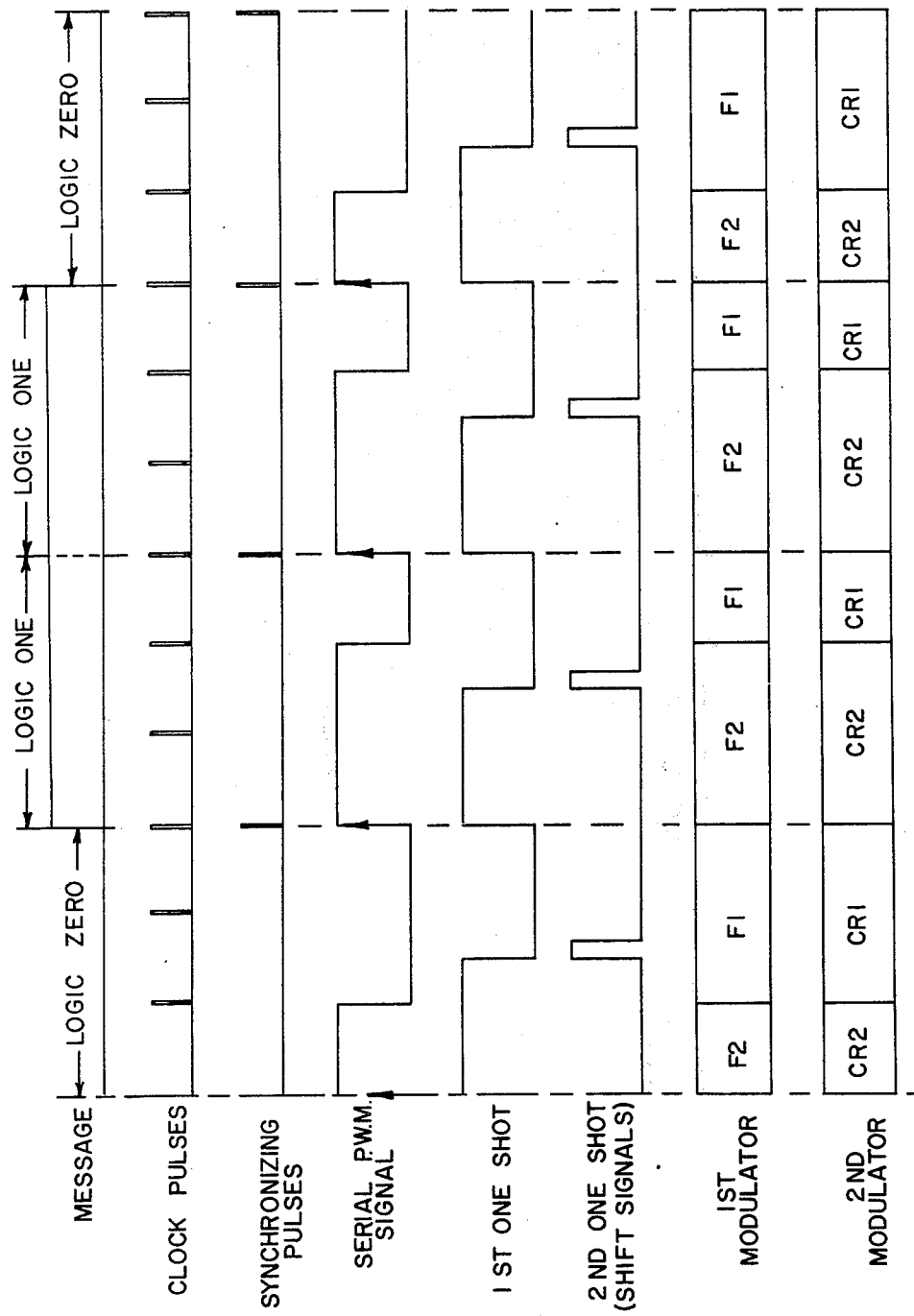
FIG. 7 is a graph which illustrates wave forms of signals which aid in the understanding of the operation of power line communication system shown in FIGS. 1–5.

A suitable parallel to serial converter and a pulse width modulator which may be used for these functions shown in block 72, are illustrated in detail in FIG. 2. The parallel signals from the interrogation and response control 14 are applied to the parallel inputs of a shift register 80, and this signal is clocked out serially by the output of a divide-by-three counter 82 which is driven by a 180 Hz clock 84. A parity generator 86 calculates the parity and adds a bit when necessary to provide an even (or odd, as desired) number of bits at the logic one level. Predetermined outputs of the divide-by-three counter are applied to a gating arrangement 88 which receives the serial binary base band signal, divides each bit into three parts, and gates the parity bit into the proper location at the end of each serial word. The three-part bit always starts with a positive transition which remains at the logic one level for the first one-third of the bit; the middle portion of the bit is at the logic level which corresponds to the original bit received from the shift register 80; and, the last one-third of the bit is at the logic zero level. FIG. 6 illustrates the format of the serial word prepared by shift register 80, with the original serial interrogation signal being referred to as signal IS1. It will be noted that signal IS1 includes an 8 bit repeater address, a 5 bit remote communication terminal address and a 3 bit function identifier, but any suitable number of bits may be used depending upon the number of repeaters, the maximum number of remote terminals per repeater, and the maximum number of functions to be performed. FIG. 7 is a graph which illustrates the binary nature of the message to be pulse width modulated, with the message being indicated as a 4 bit message in order to simplify the graph. The 180 Hz clock pulses provided by the clock 84 are illustrated, as are the 60 Hz sychronizing signals provided by counter 82 which are applied to shift register 80 for serially clocking the bits of the interrogation signal from the shift register 80. A synchronizing pulse thus appears at the start of each original bit and the clock pulses divide the original bit into three parts. The logic of the gates 88 provides a logic one when the synchronizing pulse and clock pulse coincide, the next clock pulse causes the gate to provide the same signal as the original bit, and the next clock pulse provides a logic zero. The 4 bit message, illustrated in FIG. 7 as being a logic zero, a logic one, a logic one, and a logic zero, appear in pulse width modulated form as "serial P.W.M. signals" in FIG. 7. The positive transition at the start of each original bit is employed by receiver circuitry for synchronization purposes.

Returning to FIG. 1, the modem 76 establishes a telephone link with a modem 90 which is part of the central communication terminal located at the selected distribution substation. The serial pulse width modulated signal shown in FIG. 7 is converted to a sequential tone signal by a first modulator 92. A sequential tone signal, which appears in FIG. 7, adjacent the legend "1st modulator", is at a frequency F2, such as 2 KHZ, when the pulse width modulated signal is at the logic one level, and at a frequency F1, such as 1 KHZ when the pulse width modulated signal is at the logic zero level.

The sequential tone signal provided by the first modulator 92 is applied to a second modulator 94 as the modulating wave for a frequency modulated carrier. The second modulator is preferably the form of modulation known as frequency shift keying, whereby the carrier frequency $f_c$ changes between a frequency $f_c + \Delta f$ and $f_c - \Delta f$ at a rate dependent upon the frequency of the sequential tone modulating wave. Thus, if the carrier frequency $f_c$ is 101 KHZ and $\Delta f$ is 1 KHZ, the carrier would switch between 102 KHZ and 100 KHZ at the rate of 2 KHZ in response to a 2 KHZ tone, and between 102 KHZ and 100 KHZ at the rate of 1 KHZ in response to a 1 KHZ tone. The output of the second modulator 94 is shown in FIG. 7, with CR2 indicating the 2 KHZ change rate responsive to frequency F2 of the first modulator 92, and with CR1 indicating the 1 KHZ change rate responsive to frequency F1 of the first modulator 92. Instead of the second modulator 94 being of the FSK type, it may be of the frequency modulation or phase types in which the instantaneous frequency or phase of the sine wave carrier differs from the carrier frequency or phase by an amount proportional to the value of the modulating wave.

The output of the second modulator 94 is amplified in a transmitter 96 and coupled to one of the first power line conductors 23 of the primary distribution network via a bidirectional coupler 97 which includes a 60 Hz blocking capacitor 98 and a matching transformer 100. The signal is usually coupled between one of the line conductors and the common neutral return or ground wire. The matching transformer 100 includes a primary winding 102 and a secondary winding 104. The signal from transmitter 96 is applied between a predetermined tap on the primary winding 102 and ground. The capacitor 98 and the secondary winding 104 are serially connected from one of the first power line conductors 23 to ground.

The modulated carrier is picked up by a unidirectional coupler associated with each repeater, such as unidirectional couplers 64 and 68. The unidirectional couplers may be of the magnetic field type, and as illustrated relative to coupler 68, may include a ferrite rod antenna 110 having a coil 112 tuned by a capacitor 114 to the frequency of the interrogation signal, and an amplifier 116. A suitable unidirectional coupler of the magnetic field type is disclosed in co-pending application Ser. No. 546,068, filed Jan. 31, 1975, which is assigned to the same assignee as the present application.

The amplified interrogation signal provided by each of the unidirectional couplers is applied to the interrogation channel of its associated addressable repeater, such as repeaters 60 and 62. Since each of the repeaters are of like construction, only repeater 62 will be described in detail.

Repeater 62 includes interrogation and response channels, with the interrogation channel including a receiver and demodulator 120. The receiver 120 may be conventional, typically including a limiter for removing noise from and amplifying the carrier signal, and a demodulator circuit for producing a modulated base band pulse width modulated interrogation logic signal similar to the signal provided by function 72.

The output of the receiver 120 is supplied to a serial to parallel converter and decoder circuit 122 which determines if the interrogation signal is destined for a remote communication terminal associated with a load connected to its associated distribution transformer. If the repeater recognizes the signal and the parity checks, it removes its address from the interrogation signal IS1, it prepares a modified interrogation signal IS2, the format of which is illustrated in FIG. 6, and it applies the signal in parallel, base band logic form to a parallel to serial converter, a pulse width modulator, first and second frequency modulators, and an amplifying transmitter, all shown generally at 124. The output of the transmitter portion of block 124 is applied to the second power line conductors 51 via the bidirectional coupler 70. The frequency band occupied by the interrogation signal provided by the transmitter is non-overlapping with the frequency band of the signal received by receiver 120, as described in the hereinbefore mentioned co-pending application Ser. No. 425,759, filed Dec. 18, 1973. This application is hereby incorporated into the present application by reference. The change in frequency prevents the transmitted signal from acting as an input to receiver 120, and thus the gain of the transmitter may be selected without limitation due to feedback and oscillation problems. This interrogation channel of repeater 62 is shown in greater detail in FIG. 3.

Figure 3:
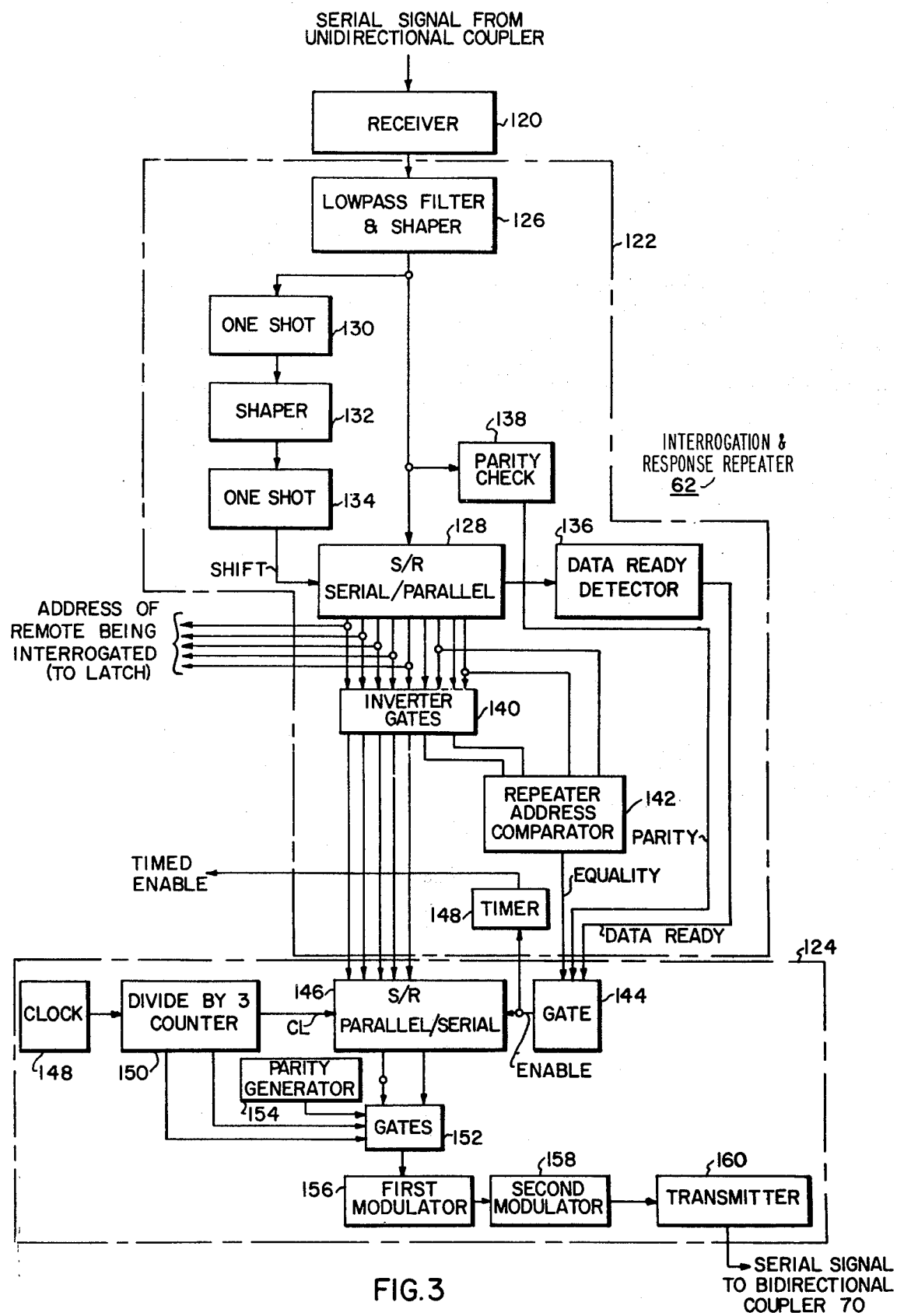
FIG. 3 is a block schematic diagram of the interrogation channel of a repeater which may be used in the repeater shown in FIG. 1.

More specifically, FIG. 3 illustrates applying a demodulated base band pulse width modulated interrogation signal from receiver 120 to a low pass filter and shaping circuit 126. The shaping circuit may be a Schmitt trigger, or a binary logic switching circuit. This serial signal is clocked into a serial to parallel shift register 128 using the self locking format of the signal for synchronization.

A suitable arrangement for providing shift signals for shift register 128 may include a first one shot circuit 130, a shaper circuit 132, and a second one circuit 134. The first one shot circuit 130, in response to the rising level of the signal at the start of each bit is triggered to provide a square wave which has a negative transition at substantially the mid point of the bit. The shaper circuit 132 perfects the form of the square wave, to provide an output substantially as shown in FIG. 7 adjacent the legend "1st one shot". The negative transition of the square wave output by the shaper 132 triggers the second one shot 134 to provide a shift signal, as illustrated in FIG. 7, which occurs at substantially the mid point of the bit. It will be remembered that the mid point of each bit carries the original logic signal, and thus the original logic signal, i.e., a logic one or a logic zero, is clocked into the shift register.

A sync bit at the logic one level precedes the serial data word, the when this bit is clocked to the last stage of the shift register, it is detected by a data ready detector 136. The output of the data ready detector 136 becomes true when it detects this bit, to denote that the complete word has been received.

A parity check circuit 138 checks to see if the selected parity convention is met, and if the parity checks the parity check circuit 138 provides a true output, denoting that it considers the word to be error-free.

The parallel output of shift register 128 is applied to inverter gates 140, and selected outputs of the shift register 128 and of the inverter gates 140 are applied to an address comparator 142. If the portion of the interrogation signal which contains the repeater address matches the unique address of repeater 62, comparator 142 outputs an equality or true signal.

The equality signal from comparator 142, the parity signal from the parity check circuit 138, and the data ready signal from the data ready detector 136 are all applied to a gate 144. If these signals are all true, the gate 144 provides an enable signal for the transmitter 124, and a timed enable, via timer 148, for its response channel.

Transmitter 124 includes a parallel to serial shift register 146, to which only the remote communication terminal address and function identifier portions of the interrogation signal IS1 are applied. When gate 144 provides an enable signal, a 180 Hz clock 148, a divide-by-three counter 150 and gates 152 provide a serial pulse width modulated binary signal, to which a parity bit is added as necessary by a parity generator or calculator 154. This base band signal is subjected to the two stage frequency modulation hereinbefore described by first and second modulators 156 and 158, respectively, and the signal is amplified and applied to bidirectional coupler 70 by transmitter 160. Bidirectional coupler 70 is similar in construction to the bidirectional coupler 97, hereinbefore described, but since it is connected to the secondary side of distribution transformer 26 its components are selected with a lower voltage rating and are therefore less costly.

The format of the interrogation signal, as modified by repeater 62, is illustrated in FIG. 6 as interrogation signal IS2. Interrogation signal IS2 is applied to all of the remote communication terminals connected to the second power line conductors 51, such as remote communication terminal 54 (FIG. 1) associated with load 52.

Remote communication terminal 54 includes a bidirectional coupler and protector 162 connected to the second power line conductors 51. A suitable coupler for remote communication terminals is disclosed in co-pending application Ser. No. 444,587 filed Feb. 21, 1974, which is assigned to the same assignee as the present application. The interrogation signal picked up by coupler 162 is applied to a receiver 164, which is similar to receiver 120 of the repeater 62. Receiver 164 demodulates the signal and applies it to a serial to parallel converter and decoder circuit 166. If the interrogation signal received is addressed to this remote communication terminal, the function identifier is decoded and the requested function is performed. Optional functions, such as controlling the on and off times of electrical loads, are illustrated generally at 168. If the requested function is to read a meter, such as an electric, gas or water meter, an encoder 170 is enabled which applies the meter reading data, such as provided by meter 56, to a parallel to serial converter, pulse width modulator, first and second stages of frequency modulation, and an amplifying transmitter, all shown generally at 172. The serialized response signal from the transmitter portion of the function shown at block 172, which occupies a frequency band which is non-overlapping with the bands of signals IS1 and IS2, is applied to the coupler and detector 162, which in turn places the response signal on one of the second power line conductors 51.

Figure 4:
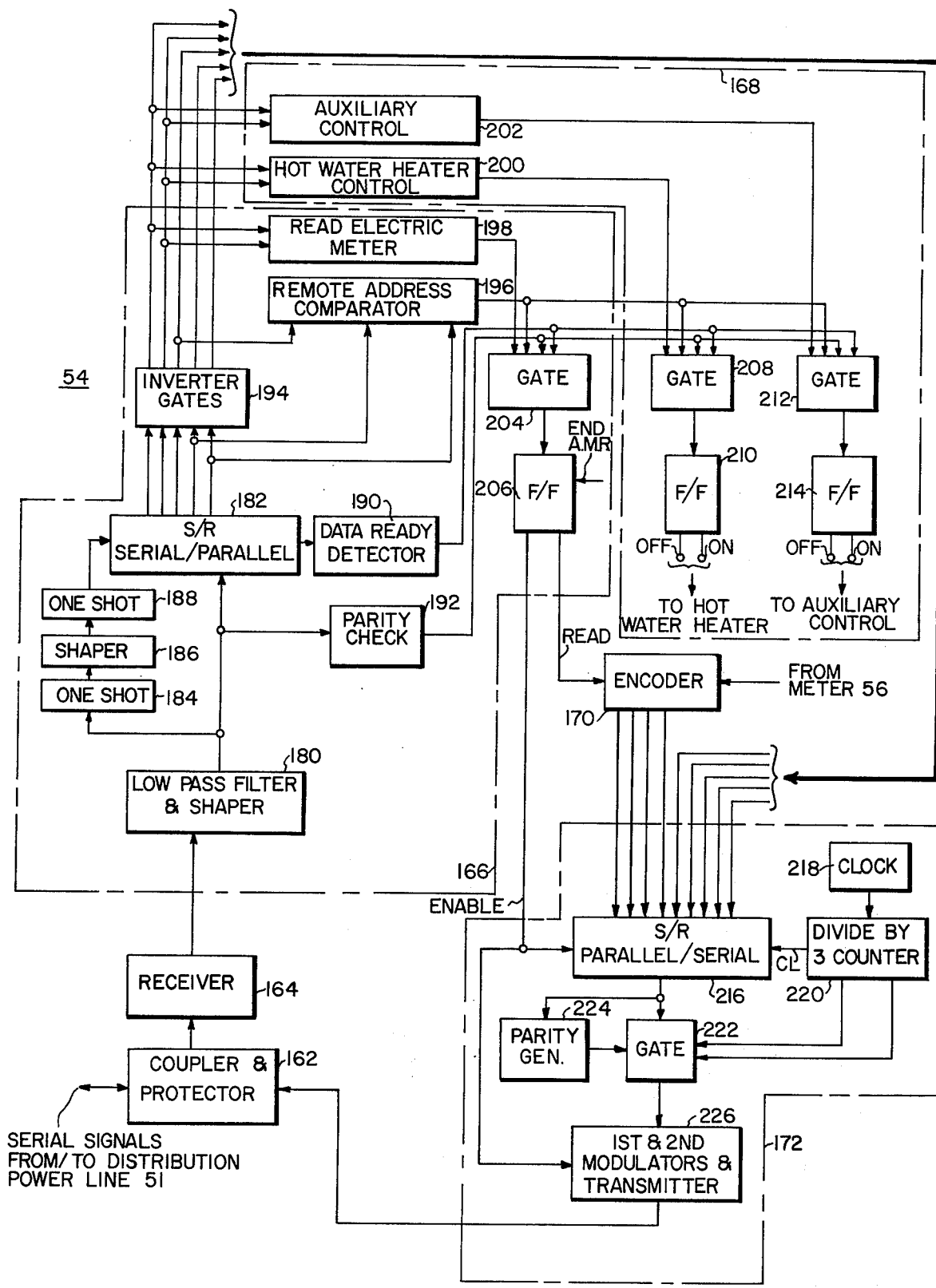
FIG. 4 is a block schematic diagram of a remote communication terminal which may be used for the remote communication terminals shown in FIG. 1.

FIG. 4 is a more detailed block and schematic diagram of the remote communication terminal 54 shown in FIG. 1. The modified interrogation signal IS2, after demodulation in receiver 164, is directed to a low pass filter and shaper circuit 180 and then to a serial to parallel shift register 182. The shift register 182 is clocked by the self clocking format of the demodulated interrogation signal IS2, by utilizing a one shot circuit 184, a shaper circuit 186 and a one shot circuit 188, as hereinbefore described relative to the clocking of shift register 128 in the interrogation channel of repeater 62. When the sync bit (a leading one) is clocked to the last stage of shift register 182, a data ready detector 190 provides a true output, and if the parity checks, a parity check circuit 192 provides a true output.

The parallel output of shift register 182 is applied to inverter gates 194, and the proper combination of outputs of the shift register 182 and the inverter gates 194, which correspond to the remote terminal address portion of the modulated interrogation signal IS2, are applied to remote address comparator 196. If a remote communication terminal 54 is uniquely addressed by signal IS2, comparator 196 provides a true output.

A plurality of comparators corresponding to the number of automatic functions which may be performed are provided for decoding the function identifier portion of the interrogation signal IS2. For purposes of example, it will be assumed that a comparator 198 identifies an automatic meter reading function, a comparator 200 identifies a load control function, such as control of an electric hot water heater, and a comparator 202 identifies an auxiliary control function, such as a service disconnect function. A gate 204 and flip-flop 206 are associated with the automatic meter reading function, a gate 208 and flip-flop 210 are associated with the hot water heater control function, and a gate 212 and flip-flop 214 are associated with the auxiliary function.

The outputs of the data ready detector 190, the parity check circuit 192 and the remote address comparator 196 are all applied to gates 204, 208 and 212. The outputs of function comparators 198, 200, 202, are applied to gates 204, 208 and 212, respectively.

If the input signals to gate 204 are all true, flip-flop 206 will be set, providing a read signal for encoder 170 and enable signals for the transmitter function illustrated generally at 172. The encoder 170 may be of the type described in U.S. Pat. No. 3,820,073 entitled "Solid State Remote Meter Reading System Having Non-Volatile Data Accumulation" which is assigned to the same assignee as the present application; or, any other suitable encoder may be used.

The encoder 170, when enabled by a read signal from flip-flop 206 applies its count to a parallel to serial shift register 216. The unique address of the remote communication terminal along with the function identifier are also applied to the shift register 216. It would also be suitable to apply the address of the repeater associated with remote terminal 54 to shift register 216, but in the preferred embodiment of the invention the repeater address is added to the response signal in the response channel of the repeater as will be hereinafter described.

The parallel input data to shift register 216 is clocked out, and a self clocking format is provided by a 180 Hz clock 218, a divide-by-three counter 220 and gate 222. A parity calculator 224 provides a parity bit when necessary, and a transmitter 226 provides a two stage frequency modulation, all as hereinbefore described relative to the transmitter portions of the central terminal located at the substation, and the interrogation channel of repeater 62. The format of the response signal is illustrated in FIG. 6 as signal RS1. It will be noted that signal RS1 includes the remote address, the function identifier, and the meter reading data. The setting of flip-flop 206 may initiate a timer which provides an "end AMR" signal to reset the flip-flop 206 after a period of time sufficient to carry out the meter reading function.

While the remote communication terminal is described as providing the response signal with a self clocking format, it would also be suitable to eliminate the self clocking format from the response communication link. The interrogation and response control does not require the self clocking format since it will usually have a precision oscillator. The receiver channel of the repeater 62, instead of clocking the data from a self clocking format, may have a free running oscillator which synchronizes itself with the lading sync bit of the response signal. Once synchronized, even a low cost oscillator will be accurate for checking the relatively short data words involved.

If the function identifier requested a load control function, the inputs to gate 208 would all be true and flip-flop 210 would be set to the state opposite to its previous state, to turn off the water heater, or to enable it to turn on in response to its temperature control.

If the function identifier requested the auxiliary function, the inputs to gate 212 would all be true and flip-flop 214 would be set to the state opposite to its previous state, to provide the desired control signals for the auxiliary function.

The setting of flip-flop 210 or flip-flop 214 may initiate a response signal which is similar to response signal to RS1, except it would not include meter reading data. This response signal would indicate that the function requested had been performed.

Referring again to FIG. 1, the response signal RS1 applied to the second distribution power line conductors 51 is picked up by the bidirectional coupler 70 and applied to the receiver channel of repeater 62. The receiver channel includes a receiver and demodulator 230, and a serial to parallel inverter and decoder. If a response is received from the remote terminal the repeater expects a response from, if the parity checks, and if it is received within the predetermined period of time set by the repeater for receiving a response, the response signal is applied to a parallel to serial converter, and a transmitter with the two stages of frequency modulation, all indicated generally at 234. Transmitter 234 adds the address of the repeater 62, changes the frequency band to one which is non-overlapping with signals IS1, IS2 and RS1, and applies the modified response signal, indicated in FIG. 6 as signal RS2, to the second power line conductor 51. This response signal is sent back to the central communication terminal through the distribution transformer 26, over the first power line conductors 23. It should be noted that if the remote terminal 54 fails in a mode in which it continuously transmits a signal RS2, that repeater 62 blocks this signal from the central communication terminal. Thus, the failure of a remote communication terminal will not tie up the whole communication system.

Figure 5:
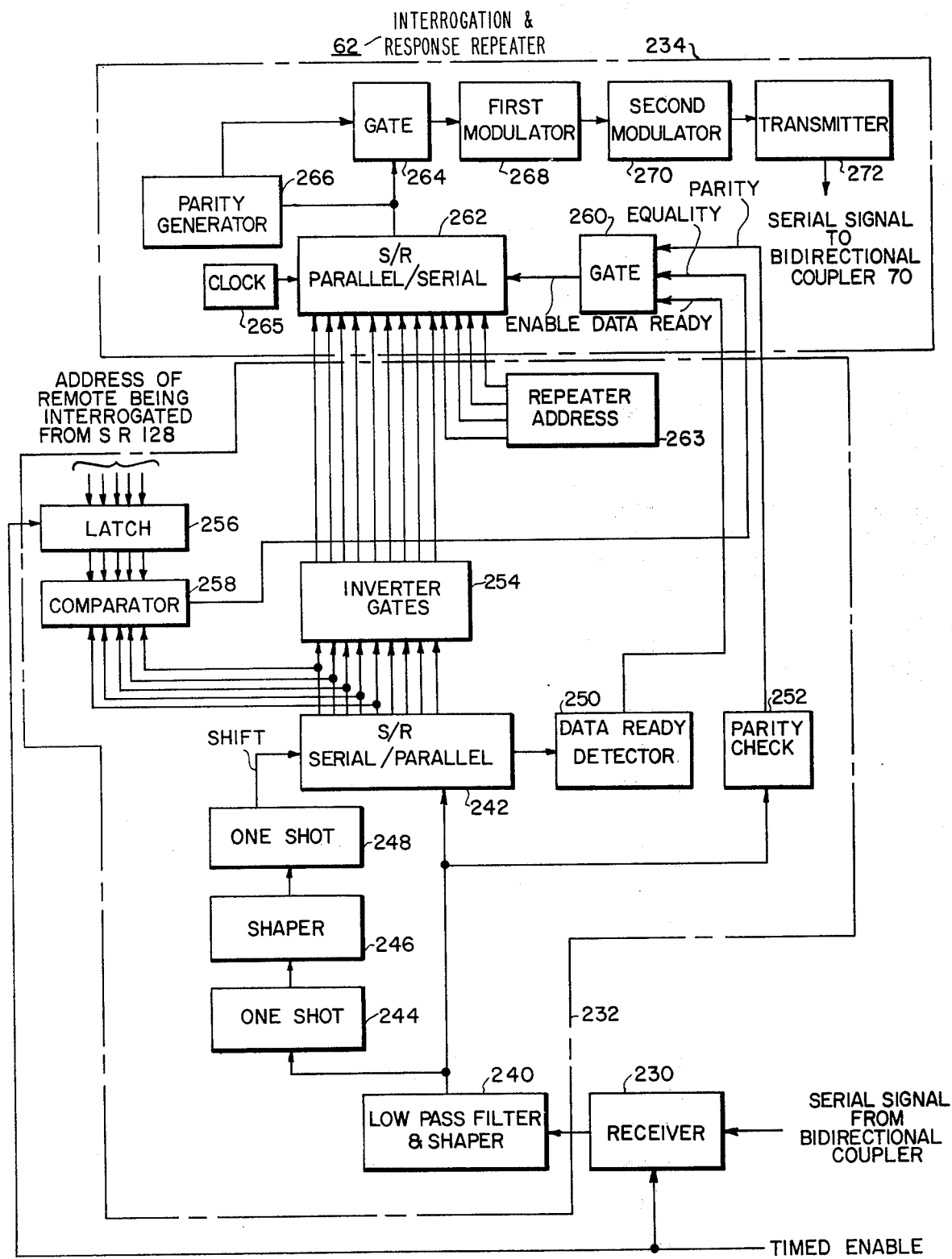
FIG. 5 is a block schematic diagram of a response channel of a repeater which may be used in the repeaters shown in FIG. 1.

FIG. 5 is a more detailed block and schematic diagram of the response channel of repeater 62. The serial demodulated response signal RS1 from receiver 230 is applied to a low pass filter and shaper circuit 240. The output of the shaper circuit 240 is applied to the serial input of a serial to parallel shift register 242. If the response signal has a self clocking format it is utilized by a one shot circuit 244, a shaper 246 and a one shot circuit 248, to provide shift pulses for the shift register 242, as hereinbefore described. If it does not have a self clocking format, the leading sync bit would synchronize an oscillator which clocks the shift register. When the leading sync bit of the serial word is clocked to the last stage of shift register 242, it is detected by a data ready detector 250, which provides a true output to indicate that a complete word has been received and is now stored in shift register 242. The parity of the word is checked by the parity check circuit 252, and if the parity checks the parity check circuit 252 provides a true output.

The parallel output of shift register 242 which corresponds to the address of a remote communication terminal is applied to one side of a comparator 258. The other side of comparator 258 receives the address which was stored in a latch 256 when the interrogation channel of repeater 262 sends a valid interrogation signal to its remote communication terminal. The timed enable from timer 148 of the interrogation channel holds the information in latch 256 for a period of time sufficient to receive a response from the interrogated remote communication terminal. If the address of a remote communication terminal received in the response signal is the same as the stored address, comparator 258 provides an equality or true output signal.

The parallel output of shift register 242 is applied to the parallel inputs of a parallel to serial shift register 262 through inverter gates 254, and the address of the repeater, provided by block 263 is also applied to the parallel inputs of shift register 262.

The outputs of the data ready detector 250, the parity check circuit 252, and the comparator 258 are all applied to a gate 260, and if these outputs are all true, gate 260 provides an enable signal for the shift register 262. When the enable signal is received, a clock 265 clocks the data from the shift register serially into a gate 264. A parity generator or calculator 266 calculates the parity and inserts a bit when necessary into the gate 264. The output of gate 264 is applied to first and second modulators 268 and 270, respectively, and then to an amplifying transmitter 272, as hereinbefore described.

The output of transmitter 272 is applied to the bidirectional coupler 70 shown in FIG. 1. It will be noted that the serial output signal from shift register 262 is not pulse width modulated, as the signal now being prepared will be sent to the digital computer, which does not require the self clocking format for synchronization purposes, as hereinbefore described.

Returning now to FIG. 1, the modified response signal RS2, which is applied to the second power line conductor 51 via the coupler 70, proceeds through the distribution transformer 26 to the first power line conductors 23. The modified response signal RS2 is picked up from the power line conductors 23 by the bidirectional coupler 97 and applied to a receiver and demodulator circuit 280. The receiver 280 demodulates the response signal and applies it to a data set interface 282, which is similar to the data set interface 74. Modem 90 sends the signal to the central control station over the telephone link, where it is received by modem 76 and applied to the interrogation and response control 14. This completes the interrogation and response cycle initiated by the interrogation signal IS1 prepared by control 14.

In summary, there has been disclosed a new and improved distribution network power line communication system which substantially reduces the complexity of a communication terminal located at the remote loads, by providing uniquely addressable repeaters at each of a distribution transformers in the distribution system. The uniquely addressable repeaters each include storage and logic functions which remove its address from an interrogation signal, and it stores the address of the remote communication terminal that it expects to receive a reply from. It also initiates a timing period within which it should receive a reply from the remote communication terminal. When a reply is received, it is checked against the stored address. If the reply is from the proper remote communication terminal, and it is received within the predetermined time period, the repeater adds its address to the response signal and sends it back to the interrogation source. Each repeater is associated with a unidirectional coupler adapted to pick up an interrogation signal from the primary side of a distribution transformer, and a bidirectional coupler which is connected to the secondary side of the distribution transformer. This arrangement removes the distribution transformer as an impedance source for the interrogation signals, and it substantially reduces the cost of the couplers required for each repeater by forcing the response signal back to the interrogation source through the distribution transformer from its secondary to its primary side, which direction provides a lower attenuating impedance to the communication signal than the opposite direction through the transformer. Further, the new and improved distribution power line carrier communication system provides signals which have a self clocking format, making it unnecessary for the interrogating source to provide timing and synchronization signals for use throughout the system, and a new and improved two stage modulation substantially reduces the drift problem associated with prior art arrangements.

We claim as our invention:

1. A power line communication system, comprising:
uniquely addressable repeater means,
uniquely addressable remote communication terminals,
means providing an interrogation signal which includes an address of a selected repeater means, and an address of a selected remote communication terminal,
a first communication link including power line conductors interconnecting said means which provides said interrogation signal and said repeater means,
a second communication link including power line conductors interconnecting each repeater means with certain of said remote communication terminals,
each of said repeater means, when uniquely addressed by said interrogation signal over said first communication link, includes means for modifying said interrogation signal by removing its address therefrom and for applying the modified interrogation signal to its associated second communication link,
each of said remote communication terminals, when uniquely addressed by a modified interrogation signal over its associated second communication link, providing a response signal on said second communication link,
and response receiving means for receiving the response signal provided by an addressed remote communication terminal.

2. The power line communication system of claim 1 wherein the response receiving means includes means associated with the repeater means which is connected to the second communication link associated with a responding remote communication terminal, with the response receiving means including means for modifying the response signal by adding the unique address of the associated repeater means to the response signal, and for applying the modified response signal to the first communication link, and wherein the response receiving means also includes means connected to the first communication link for receiving the modified response signal.

3. The power line communication system of claim 1 including a utility meter associated with each remote communication terminal, and encoder means for translating the reading of said utility meter to a signal which is incorporated into the response signal provided by the remote communication terminal when it is uniquely addressed by the modified interrogation signal.

4. The power line communication system of claim 1 wherein the responding remote communication terminal adds its unique address to the response signal.

5. The power line communication system of claim 1 wherein the responding remote communication terminal adds its address and the address of its associated repeater means to the response signal.

6. The power line communication system of claim 1 including means providing a plurality of automation functions associated with each remote communication terminal, and the interrogation signal includes a function identifier which selects the automation function to be performed, and wherein the repeater means includes said function identifier in the modified interrogation signal, and each remote communication signal includes means for decoding the function identifier and means for activating the identified function when the remote communication terminal is uniquely addressed.

7. The power line communication system of claim 6 wherein the responding remote communication terminal includes its address and function identifier in its response signal.

8. The power line communication system of claim 7 wherein the response receiving means includes response modifying means associated with a repeater means which is connected to the second communication link associated with a responding remote communication terminal, with said response modifying means adding the address of the associated repeater means to the response signal and applying the resulting modified response signal to the first communication link, and wherein the response receiving means includes means for receiving the modified response signal.

9. The power line communication system of claim 1 including a distribution transformer associated with each repeater means, with each distribution transformer interconnecting a power line conductor of the first communication link with a power line conductor of a second communication link.

10. The power line communication system of claim 9 wherein each repeater means receives the interrogation signal from the first communication link and applies the modified interrogation signal to a second communication link, by-passing the associated distribution transformer.

11. The power line communication system of claim 1 wherein each repeater means includes means for recognizing a valid response signal including means storing the address of the remote communication terminal included in an interrogation signal, each time the repeater means provides a modified interrogation signal, the remote communication terminals of each include means for including its own address in its response signal, and wherein the response receiving means includes means at each repeater means for comparing said stored address with the address of the remote communication terminal in a response signal, means at each repeater means for applying the response signal to the first communication link when the addresses match, indicating a valid response signal, and means for receiving the response signal over the first communication link.

12. The power line communication system of claim 11 wherein each repeater means includes means for enabling the response receiving means associated with a repeater for a predetermined period of time, following the application of a modified interrogation signal to its associated second communication link, with the predetermined period of time being selected to allow sufficient time for the addressed remote communication terminal to provide a response signal.

13. The power line communication system of claim 11 wherein the response receiving means includes response modifying means at each repeater means for modifying a valid response signal received thereby by adding the address of its associated repeater means to the response signal, and applying the resulting modified response signal to the first communication link, and wherein the response receiving means also includes means remote from the repeater means associated with the first communication link for receiving the modified response signal.

14. The power line communication system of claim 1 wherein the means providing the interrogation signal and the repeater means include cooperative error checking means whereby a repeater means only provides a modified interrogation signal when its portion of the error checking means indicates the interrogation signal is error-free.

15. The power line communication system of claim 1 wherein each remote communication terminal and the response receiving means each include cooperative error checking means whereby the response receiving means rejects response signals when its portion of the error checking means indicates the response signal is not error-free.

16. The power line communication system of claim 1 wherein each remote communication terminal and its associated repeater means each include cooperative error checking means whereby the remote communication terminal rejects modified interrogation signals when its portion of the error checking means indicates the modified interrogation signal is not error-free.

17. The power line communication system of claim 1 including a distribution transformer associated with each repeater means, with each distribution transformer interconnecting a power line conductor of the first communication link with a power line conductor of a second communication link, and wherein the response receiving means includes means at each repeater means for receiving and recognizing a valid response signal and for applying such valid response signal to the first communication link, and means remote from the repeater means for receiving the valid response signal over the first communication link.

18. The power line communication system of claim 1 wherein the means providing an interrogation signal includes means providing a logic signal having a plurality of serial bits, and pulse width modulation means responsive to the logic format of said logic signal providing a serial signal having a self clocking format which starts each bit with a like transition between first and second signal levels, with the duration of the signal at the second level being responsive to the logic level of the associated bit of the logic signal.

19. The power line communication system of claim 1 wherein the means providing an interrogation signal includes means providing a base band signal in logic format, and means providing first and second successive stages of modulation, with the first stage providing a first modulated signal responsive to said base band signal, and a second stage providing a second modulated signal responsive to said first modulated signal.

20. The power line communication system of claim 1 wherein the means which provides an interrogation signal includes means providing a multi-tone, two-stage frequency modulated carrier.

21. The power line communication system of claim 1 wherein the means providing an interrogation signal provides a base band signal, a two-tone modulated signal responsive to the base band signal, and a frequency shift keyed modulated carrier signal responsive to said two tone modulated signal.

22. The power line communication system of claim 1 wherein the means providing an interrogation signal provides a base band signal, a two-tone modulated signal responsive to the base band signal, and a frequency modulated carrier signal responsive to said two-tone modulated signal.

23. The power line communication system of claim 1 wherein the means providing an interrogation signal provides a base band signal, a logic signal having a self clocking format responsive to the base band signal, a two-tone modulated signal responsive to the logic signal and a frequency modulated carrier responsive to said two-tone modulated signal.

24. The power line communication system of claim 1 wherein the response receiving means includes response receiving means associated with each repeater means, and wherein each repeater means includes means enabling its associated response receiving means for a predetermined period of time following the application of a modified interrogation signal to its associated second communication link, with the predetermined period of time being selected to allow sufficient time for the uniquely addressed remote communication terminal to provide a response signal.

25. A power line communication system comprising:
first power line conductor means,
second power line conductor means,
distribution transformer means interconnecting said first and second power line conductor means,
electrical loads connected to said second power line conductor means,
uniquely addressable repeater means associated with certain of said distribution transformer means,
uniquely addressable remote communication terminals associated with certain of said electrical loads,
a source of interrogation signals which provides an interrogation signal having an address of a selected repeater means and the address of a selected remote communication terminal,
response receiving means,
means providing an interrogation communication link between said source of interrogation signals and said remote communication terminals, including said first power line conductor means, unidirectional coupling means coupling said first power line conductor means to said repeater means, bidirectional coupling means coupling said repeater means to said second power line conductor means, and means coupling each remote communication terminal to said second power line conductor means,
means providing a response communication link between said remote communication terminal and said response receiving means, including said second power line conductor means, said bidirectional coupling means, said repeater means, said bidirectional coupling means, said second power line conductor means, said distribution transformer means, said first power line conductor means, and means coupling said response receiving means to said first power line conductor means, whereby each remote communication terminal provides a response signal for said response receiving means when it is addressed by an addressed repeater means, with the interrogation communication link by-passing said distribution transformer means while the response communication link utilizes said distribution transformer means.

26. The power line communication system of claim 25 wherein the repeater means, when uniquely addressed, includes means for modifying the interrogation signal by removing its address therefrom, and means for modifying the response signal by adding its address thereto.

27. The power line communication system of claim 25 including a utility meter associated with each remote communication terminal, and encoder means for translating the reading of said utility meter to a signal which is incorporated in the response signal provided by the remote communication terminal when it is uniquely addressed by the interrogation signal.

28. The power line communication system of claim 25 wherein the responding remote communication terminal adds its unique address to the response signal.

29. The power line communication system of claim 25 wherein the responding remote communication terminal adds its address and the address of its associated repeater means to the response signal.

30. The power line communication system of claim 25 including means providing a plurality of automation functions associated with each remote communication terminal, and the interrogation signal includes a function identifier which selects the automation function to be performed, and wherein each remote communication terminal includes means for decoding the function identifier, and means for activating the identified function when the remote communication terminal is uniquely addressed.

31. The power line communication system of claim 30 wherein the responding remote communication terminal includes its address and function identifier in its response signal.

32. The power line communication system of claim 25 wherein each repeater means includes means for recognizing a valid response signal including means storing the address of the remote communication terminal included in an interrogation signal, each time the repeater means is uniquely addressed, each remote communication terminal includes means for including its own address in its response signal, and wherein each repeater means includes means for comparing said stored address with the address of the remote communication terminal in a response signal, and means at each repeater means for applying the response signal to the response communication link when the addresses match, indicating a valid response signal.

33. The power line communication system of claim 32 wherein each repeater means includes means for enabling its response receiving portion for a predetermined period of time when it is uniquely addressed, with the predetermined period of time being selected to allow sufficient time for the addressed remote communication terminal to provide a response signal.

34. The power line communication system of claim 32 wherein each repeater means includes response modifying means for modifying a valid response signal received thereby by adding the address of its associated repeater means to the response signal, and for applying the resulting modified response signal to the response communication link.

35. The power line communication system of claim 25 wherein the source of interrogation signals and the repeater means each include cooperative error checking means whereby a repeater means only permits an interrogation signal to be sent to its associated remote communication terminals when its portion of the error checking means indicates the interrogation signal is error-free.

36. The power line communication system of claim 25 wherein each remote communication terminal and its associated repeater means each include cooperative error checking means whereby the remote communication terminal rejects an interrogation signal when its portion of the error checking means indicates the interrogation signal is not error-free.

37. The power line communication system of claim 25 wherein the source of interrogaton signals includes means providing a logic signal having a plurality of serial bits, and pulse width modulating means responsive to the logic format of said logic signal providing a serial signal having a self clocking format which starts each bit with a like transmission between first and second signal levels, with the duration of the self clocking signal at the second level being responsive to the logic level of the associated bit of the logic signal.

38. The power line communication signal of claim 25 wherein the source of interrogation signals includes means providing a base band signal in logic format, and means providing first and second successive stages of modulation, with the first stage providing a first modulated signal responsive to said base band signal, and a second stage providing a second modulated signal responsive to said first modulated signal.

39. The power line communication system of claim 25 wherein the source of interrogation signals includes means providing a multi-tone, two-stage frequency modulated carrier.

40. The power line communication system of claim 25 wherein the source of interrogation signals provides a base band signal, a two-tone modulated signal responsive to the base band signal, and a frequency shift keyed modulated carrier signals responsive to said two-tone modulated signal.

41. The power line communication system of claim 25 wherein the source of interrogation signals provides a base band signal, a two-tone modulated signal responsive to the base band signal, and a frequency modulated carrier signal responsive to said two-tone modulated signal.

42. The power line communication system of claim 25 wherein the source of interrogation signals provides a base band signal, a logic signal having a self clocking format responsive to the base band signal, a two-tone modulated signal responsive to the logic signal, and a frequency modulated carrier responsive to said two-tone modulated signal.

43. The power line communication system of claim 25 wherein each repeater means includes means enabling its response receiving portion for a predetermined period of time after it has been uniquely addressed by an interrogation signal, with the predetermined period of time being selected to allow sufficient time for the uniquely addressed remote communication terminal to provide a response signal.

44. A power line communication system for transmitting carrier signals over first and second distribution network power line conductor means connected between a distribution network substation and a plurality of distribution transformers, and between the distribution transformers and a plurality of electrical loads, respectively, comprising:
- uniquely addressable repeater means at certain of the distribution transformers,
- means coupling each of said repeater means to the first and second power line conductor means connected to the associated distribution transformer,
- uniquely addressable remote communication terminals at certain of the electrical loads,
- means coupling each of said remote communication terminals to the second power line conductor means connected to the associated electrical load,
- means providing an interrogation signal which includes first and second addresses for addressing a selected repeater means and a selected remote communication terminal, respectively,
- a central communication terminal at the substation providing a first modulated carrier signal on the first power line conductor means responsive to said interrogation signal,
- said repeater means each including means for receiving and processing said first modulated carrier signal, and when uniquely addressed by the first address, for modifying the interrogation signal by removing the first address therefrom and transmitting a second modulated carrier signal responsive to said modified interrogation signal over the second power line conductor means it is coupled to,
- said remote communication terminals each including means for receiving and processing the second modulated carrier signal and when uniquely addressed by the second modulated carrier signal providing a response signal on the associated second power line conductor means,
- said repeater means each including means for receiving a response signal provided by an addressed associated remote communication terminal, and means for applying the response signal to the first power line conductor means,
- and means connected to the first power line conductor means for receiving the response signal.

45. The power line communication system of claim 44 wherein each repeater means includes means for modifying a response signal by adding its address thereto.

46. The power line communication system of claim 44 including a utility meter associated with each remote communication terminal, and encoder means for translating the reading of said utility meter to a signal which is incorporated into the response signal provided by the remote communication terminal when it is uniquely addressed by the second modulated carrier signal.

47. The power line communication system of claim 44 wherein the responding remote communication terminal adds its unique address to the response signal.

48. The power line communication system of claim 44 wherein the responding remote communication terminal adds its address and the address of its associated repeater means to the response signal.

49. The power line communication system of claim 44 including means providing a plurality of automation functions associated with each remote communication terminal, and the interrogation signal includes a function identifier which selects the automation function to be performed, and wherein the repeater means includes said function identifier in the second modulated carrier signal, and each remote communication terminal includes means for decoding the function identifier and means for activating the identified function when the remote communication terminal is uniquely addressed.

50. The power line communication system of claim 49 wherein the responding remote communication terminal includes its address and function identifier in its response signal.

51. The power line communication system to claim 44 wherein each repeater means includes means for recognizing a valid response signal including means storing the address of the remote communication terminal included in an interrogation signal each time the repeater means provides a second modulated carrier siganl, the remote communication terminals each include means for including its own address in its response signal, and wherein each repeater means includes means for comparing said stored address with the address of the remote communication terminal in a response signal, and means for applying the response signal to the second power line conductor means when the addresses match, indicating a valid response signal.

52. The power line communication system of claim 44 wherein each repeater means includes means for enabling its response receiving portion for a predetermined period of time, following the generation of a second modulated carrier signal, with the predetermined period of time being selected to allow sufficient time for the addressed remote communication terminal to provide a response signal.

53. The power line communication system of claim 44 wherein each repeater means includes response modifying means for modifying a valid response signal received thereby by adding its address to the response signal.

54. The power line communication system of claim 44 wherein the means providing the interrogation signal and the repeater means each includes cooperative error checking means whereby a repeater means only provides a second modulated carrier signal when its portion of the error checking means indicates the interrogation signal is error-free.

55. The power line communication system of claim 44 wherein each remote communication terminal and its associated repeater means each include cooperative error checking means, whereby the remote communication terminal rejects second modulated carrier signals when its portion of the error checking means indicates the signal is not error-free.

56. The power line communication system of claim 44 wherein the means providing a first modulated carrier signal includes means providing a logic signal having a plurality of serial bits, and pulse width modulator means responsive to the logic signal providing a serial signal having a self clocking format which starts each bit with a like transition between first and second signal levels, with the duration of the signal at the second level being responsive to the logic level of the associated bit of the logic signal.

57. The power line communication signal of claim 44 wherein the means providing the first modulated carrier signal includes means providing a base band signal in logic format, and means providing first and second successive stages of modulation, with the first stage providing a modulated signal responsive to said base band signal, and the second stage providing the first modulated carrier signal responsive to said signal provided by the first stage.

58. The power line communication system of claim 44 wherein the central communication terminal which provides the first modulated carrier signal includes means for providing the first modulated carrier signal in the form of a multi-tone, two-stage, frequency modulated carrier.

59. The power line communication system of claim 44 wherein the central communication terminal which provides the first modulated carrier signal includes means providing a two-tone modulated signal responsive to the interrogation signal, and a frequency shift keyed modulated carrier signal responsive to said two-tone modulated signal.

60. The power line communication system of claim 44 wherein the means providing an interrogation signal provides a base band signal in logic format, and the central communication terminal includes means providing a two-tone modulated signal responsive to the base band signal, and a frequency modualted carrier signal responsive to said two-tone modulated signal.

61. The power line communication system of claim 44 wherein the means providing an interrogation signal provides a base band signal and a logic signal having a self clocking format responsive to the base band signal, and the central communication terminal includes means providing a two-tone modulated signal responsive to the logic signal, and a frequency modulated carrier responsive to said two-tone modulated signal.

62. The power line communication system of claim 44 wherein each repeater means includes means enabling its response receiving portion for a predetermined period of time following the application of a second modulated carrier signal to said second power line conductor means, with the predetermined period of time being selected to allow sufficient time for the uniquely addressed remote communication terminal to provide a response signal.

63. A distribution network power line carrier communication system for automatically and remotely reading a utility meter, comprising:
a distribution substation,
a plurality of distribution transformers,
a plurality of electrical loads,
first power line conductors interconnecting said distribution substation with said plurality of distribution transformers,
second power line conductors interconnecting each of said distribution transformers with certain of said electrical loads,
utility meter means associated with certain of said electrical loads,
encoder means for converting the reading of said utility meter means to an electrical signal,
addressable repeater means associated with certain of said distribution transformers,
addressable remote communication terminal means associated with certain of said electrical loads, for providing a response signal when addressed which includes the signal from an associated encoder means,
a central communication terminal including means for providing an interrogation signal which includes the address of a selected repeater means and the address of a selected remote terminal means, and means for receiving signals from said remote communication terminal means,
means providing an interrogation communication link, including said first and second power line conductors which extend from said central communication terminal to said remote communication terminal means, and which by-passes said distribution transformer via their associated repeater means,
said repeater means, when uniquely addressed by said interrogation signal providing a modified interrogation signal for its associated remote communication terminals which omits the address of the repeater means,
said remote communication terminal, when uniquely addressed by the modified interrogation signal providing a response signal which includes the signal provided by its associated encoder means,
and means providing a response communication link which extends from each remote communication terminal means to the central communication terminal, via its associated repeater means and its associated distribution transformer means.

* * * * *